No. 636,746. Patented Nov. 14, 1899.
A. R. BLACK.
REVOLVING SULKY HAY RAKE.
(Application filed Mar. 1, 1899.)
(No Model.) 2 Sheets—Sheet 1.
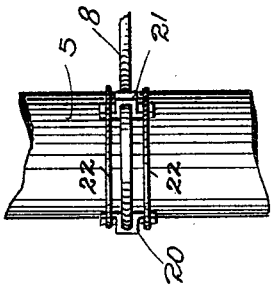
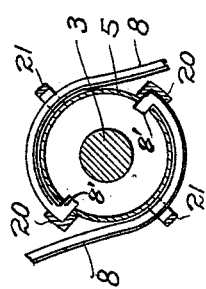
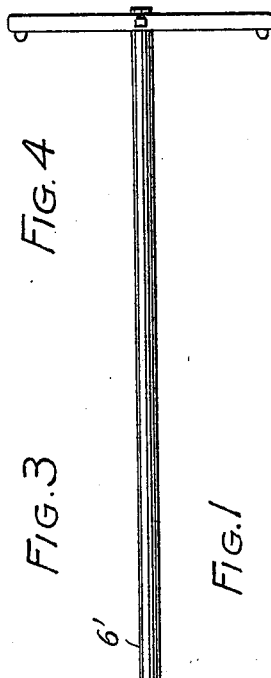
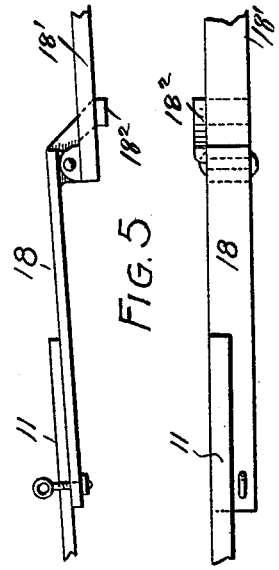
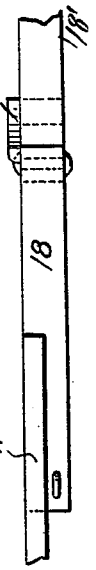
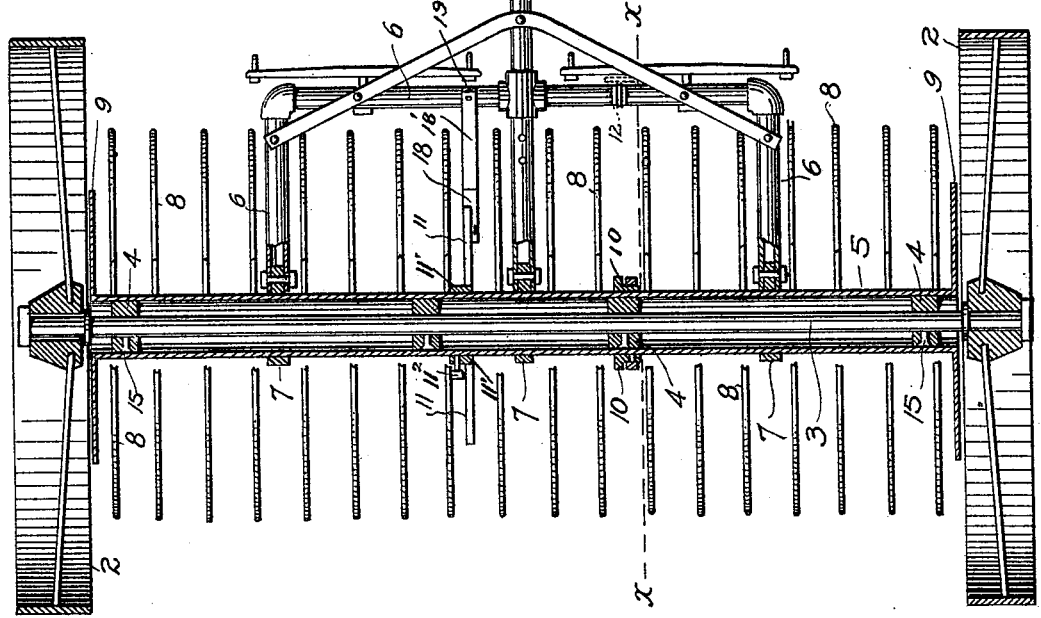
Witnesses
Inventor
Amos R. Black No. 636,746. Patented Nov. 14, 1899.
A. R. BLACK.
REVOLVING SULKY HAY RAKE.
(Application filed Mar. 1, 1899.)
(No Model.) 2 Sheets—Sheet 2.
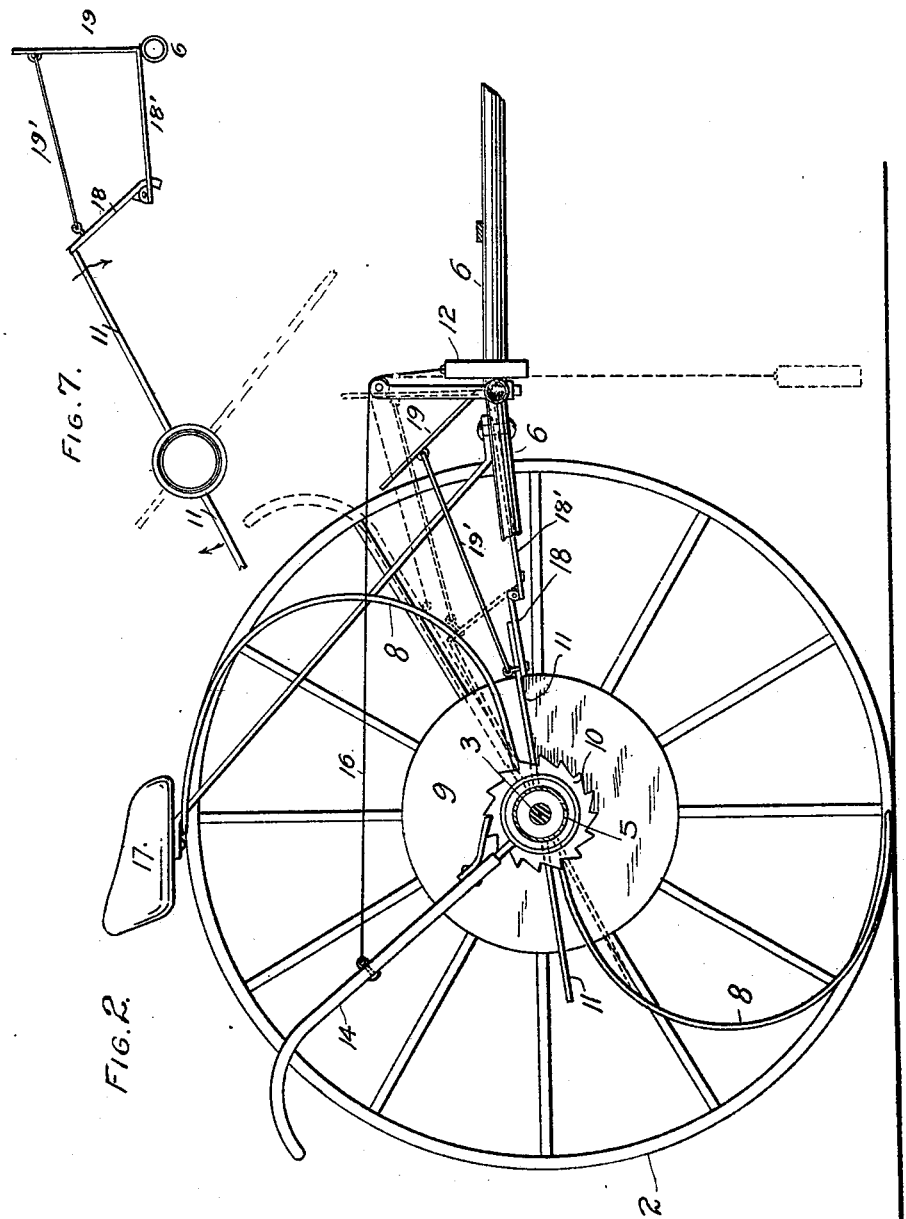

UNITED STATES PATENT OFFICE.

AMOS R. BLACK, OF LAMAR, COLORADO.

REVOLVING SULKY HAY-RAKE.

SPECIFICATION forming part of Letters Patent No. 636,746, dated November 14, 1899.

Application filed March 1, 1899. Serial No. 707,365. (No model.)

*To all whom it may concern:*

Be it known that I, AMOS R. BLACK, a citizen of the United States, residing at Lamar, in the county of Prowers and State of Colorado, have invented certain new and useful Improvements in Revolving Sulky Hay-Rakes; and I do hereby declare the following to be a full, clear, and exact description of the invention, such as will enable others skilled in the art to which it appertains to make and use the same.

My invention relates to improvements in revolving sulky hay-rakes.

The object of my improvements herein is to provide an efficient, convenient, and durable revolving sulky hay-rake that will do speedy and clean work in raking heavy crops, damp hay, or green alfalfa and be easily operated.

The invention consists of the arrangements, features, and combinations hereinafter described and claimed.

The accompanying drawings are referred to as forming a part of this specification, in which—

Figure 1 is a horizontal sectional view. Fig. 2 is a section taken along the line X X, Fig. 1, showing mechanism for operating the rake, the dotted lines representing the position of levers and weight after dumping. Fig. 3 is an enlarged section through the axle and sleeve, showing manner of fastening the rake-teeth. Fig. 4 is a top view of the same. Fig. 5 is an enlarged view of rake-lock and lock-levers. Fig. 6 is a plan view of the same parts. Fig. 7 is a view illustrating the operation of the rake locking and releasing mechanism.

The running wheels 2 are mounted on the axle 3, and circular collars 4 (see Fig. 1) are secured on the axle by means of countersunk clamping-screws 15. A cylindrical sleeve 5 is fitted loosely upon the collars 4 and adapted to revolve thereon. The two opposite series of spring rake-teeth 8 are secured to and rotate with this sleeve. The latter strengthens the axle and prevents it from springing or bending, so that the axle may be made smaller than usual, and the sleeve also constitutes an independent and easily-rotatable carrier for the rake-teeth, besides furnishing an enlarged seat for attachment of the latter.

The manner and means of securing the teeth are illustrated in Figs. 3 and 4. The shank of each rake-tooth 8 is curved upon the same circle as the sleeve 5 and provided with an interior projection or lug 8', which enters a hole in the sleeve 5. A shouldered clip 20 holds the end of the tooth thus engaged, and a U-shaped clip 21 is located one-quarter way around the sleeve 5 and serves to confine the tooth-shank at that point. Both clips 20 and 21 are secured detachably in place by circular bands 22, as shown in Fig. 4.

The ends of the sleeve 5 are each provided with a large disk 9 (see Figs. 1 and 2) for the purpose of preventing hay coming in contact with the hub of the adjacent wheel 2 on the axle 3. A tubular or pipe frame 6, provided with a guide tongue or pole 6', is attached to the sleeve 5 by means of circular straps or bands 7, within which the sleeve rotates when the rake dumps. A ratchet-wheel 10 (see Fig. 2) is fixed on the sleeve 5, and a ratchet-lever 14 is pivoted thereon and provided with a pawl that engages said wheel. A cord 16 passes from the lever 14 over a pulley journaled in a vertical arm attached to frame 6 and is held taut by a weight 12. The function of the weighted cord is to assist in dumping the rake, as hereinafter described. The sleeve 5 is provided with two opposite radial arms 11, which are adjustably secured thereto by means of a collar 11' and clamp-screw $11^2$, Fig. 1.

An arm 18' is rigidly secured to the frame 6 and projects backward therefrom in nearly horizontal position, Fig. 2. To this arm 18' is hinged a lever extension 18, whose forward end is provided with a downwardly and laterally projecting portion $18^2$, that takes under the rigid arm 18', as shown in Figs. 5 and 6. By this means the extension 18 is normally held parallel to the plane of arm 18', as shown, and thus serves as a stop or lock for the rake-teeth, but is adapted to be raised, as shown by dotted lines, Fig. 2, and full lines, Fig. 7. Such movement releases the rake and allows it to revolve and dump the gathered hay. It is effected at will by operating a treadle or foot-lever 19, Figs. 2 and 7, which is pivoted to frame 6 and connected with lever-arm 18 by means of a rod 19'.

When the series of rake-teeth 8 that are pressed upon the ground have gathered a load, the driver, who occupies the seat 17, presses forward with his foot upon the lever 19, and thereby raises the pivoted arm 18, as shown, until it disengages from the sleeve-arm 11, Fig. 7. When the sleeve 5 and rake-teeth 8 revolve half-way around and the parts 19 and 18 have automatically resumed their original position, the other arm 11 comes in contact with the lever-arm 18, and the other series of rake-teeth bear upon the ground and begin raking in their turn. It will be seen that when the lever-arm 18 thus raises the arm 11 the sleeve 5 is rotated backward to a slight degree, so that the spring-teeth 8 then engaged in raking are for the moment pressed with correspondingly greater force upon the ground. The teeth being thus put under greater tension, it is apparent that when the lock is released by raising arm 11, as above described, such teeth will rebound with corresponding force, which assists in withdrawing them from the hay and dumping the rake, and the rotary movement thus begun is completed by the pull of weight 12 upon the ratchet-lever 14 and instantly dumps the rake. The rake proper is thus revolved automatically and intermittently half-way around. The lever 14 is restored manually to its original position by the driver as soon as the rake has been relocked by the engagement of parts 11 and 18, as before described.

I desire it to be understood that I do not propose in all cases to restrict my invention by attachment of the rake-teeth to the sleeve, since certain advantageous results may be attained by attachment of the teeth directly to the axle.

What I claim is—

1. In a sulky hay-rake, the combination with the wheels and revolving sleeve, spring rake-teeth secured thereto and adapted to bear on the ground, rigid radial arms fixed to the sleeve, and lever mechanism adapted for bearing upward upon said arms, and thereby temporarily increasing the pressure and tension upon the teeth which are in action, as and for the purpose specified.

2. In a sulky hay-rake, the combination with the wheels, axle and spring rake-teeth adapted to revolve around the latter, of rigid radial arms having fixed relation with said teeth, a hinged stop having a support which holds it normally in practically horizontal position, so as to support one of said arms and thereby lock the rake in working position, and means for raising said stop, thereby elevating the previously-engaged arm and temporarily increasing the pressure of the under rake-teeth upon the ground, so that, upon release, they are thrown upward and backward by their own elasticity, as shown and described.

3. In a sulky hay-rake, the combination, with the wheels, axle, spring-teeth, and rigid radial arms rotating with the teeth, of a hinged stop upon which said arms normally bear when the rake-teeth are working, a rigid support for said stop, a hinged foot-lever, and rod connecting it with the hinged stop, for use in elevating the latter, and whereby the arm is first raised and the rake rotated sufficiently to increase the normal pressure of the working teeth upon the ground, the arm being next released; and a ratchet-wheel and lever, and a weighted cord attached to said lever for aiding the resiliency of the working teeth to effect revolution of the latter, as shown and described.

4. In a sulky hay-rake, the combination, with the wheels, the axle, a sleeve revolving thereon, spring rake-teeth, and rigid arms secured to said sleeve, and a stop for said arms, of a ratchet-wheel, lever, and a weighted cord connected with said lever, for applying constant tension upon the sleeve tending to revolve the teeth backward, as shown and described.

5. In a sulky hay-rake, the combination with axle and wheels, of rake-teeth formed of spring material and adapted to rotate around the axle, and adjustable means adapted for locking and releasing said teeth, and for pressing them forward just prior to their release, substantially as shown and described.

6. In a sulky hay-rake, the combination with the wheels and axle, a rake-head adapted to revolve on the latter and carrying spring rake-teeth, of a weighted cord connected with the rake-head and tending to revolve the rake-teeth backward, and means for locking and releasing the teeth, substantially as shown and described.

In testimony whereof I affix my signature, in presence of two witnesses, this 24th day of February, 1899.

AMOS R. BLACK.

Witnesses:
G. J. ROLLANDET,
M. E. MARTIN.